No. 672,649. Patented Apr. 23, 1901.
E. PREUSS.
PLOW.
(Application filed Oct. 21, 1899.)

(No Model.) 2 Sheets—Sheet 1.

Witnesses:
Alice E. Houghton
Otis A. Earl

Inventor,
Ernst Preuss
By Fred L. Chappell
Att'y.

THE NORRIS PETERS CO., PHOTO-LITHO., WASHINGTON, D. C.

No. 672,649. Patented Apr. 23, 1901.
E. PREUSS.
PLOW.
(Application filed Oct. 21, 1899.)
(No Model.)
2 Sheets—Sheet 2.
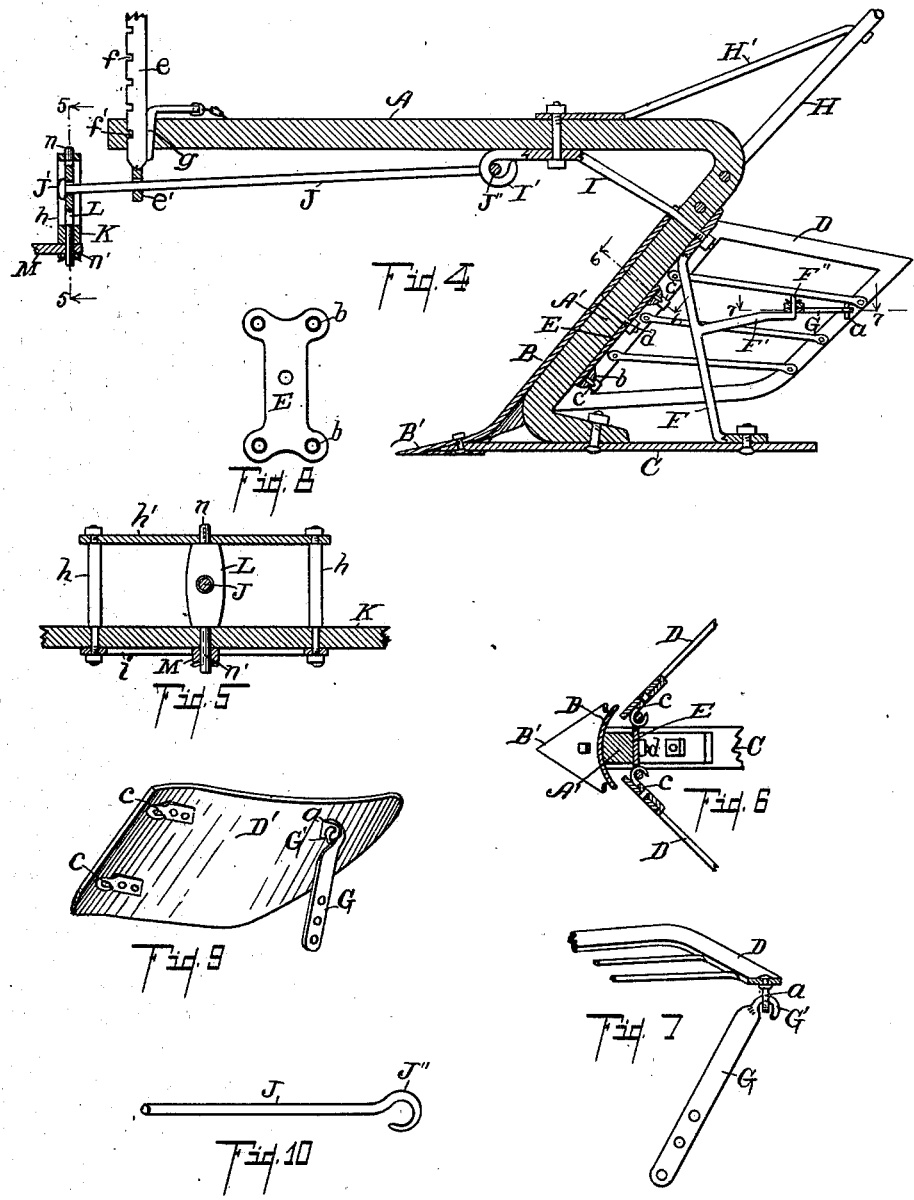
Witnesses:
Alice E. Houghton
Otis A. Earl
Inventor,
Ernst Preuss
By Fred L. Chappell
Att'y.

UNITED STATES PATENT OFFICE.

ERNST PREUSS, OF WAUSAU, WISCONSIN.

PLOW.

SPECIFICATION forming part of Letters Patent No. 672,649, dated April 23, 1901.

Application filed October 21, 1899. Serial No. 734,408. (No model.)

*To all whom it may concern:*

Be it known that I, ERNST PREUSS, (having resided in the State of Wisconsin for more than one year prior to the date of the application—to wit, since August 15, 1891—and having on oath declared my intention to become a citizen of the United States,) residing at the town of Wausau, in the county of Marathon and State of Wisconsin, have invented certain new and useful Improvements in Plows, of which the following is a specification.

This invention relates to improvements in plows which are adapted for use either in hilling up potatoes or in digging the same.

The objects of the invention are, first, to provide a plow which shall be strong and durable and at the same time easy to operate; second, to provide an improved form of construction of shovel-plow which shall be easy to keep into the ground but which will crowd the dirt out of position rather than cut it away, the advantage of which is obvious in hilling potatoes or in digging the same; third, to provide an improved construction of shovel-plow, the wings of which are adjustable to vary the width of its action; fourth, to provide improved means of detachably attaching wings to a plow so that different forms or constructions of wings can be easily substituted; fifth, to provide improved means of adjusting the wings of the shovel-plow, and, sixth, to provide an improved coupling device for use in plows of this class.

Further objects will definitely appear in the detailed description to follow.

I accomplish the objects of my invention by the devices and means described in this specification.

The invention is clearly defined and pointed out in the claims.

A structure fully embodying my invention is illustrated in the accompanying drawings, forming a part of this specification, in which—

Figure 1:
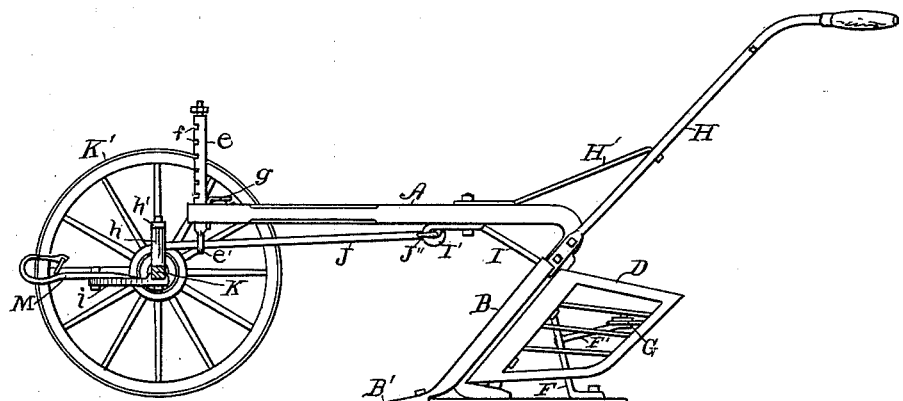
Figure 2:
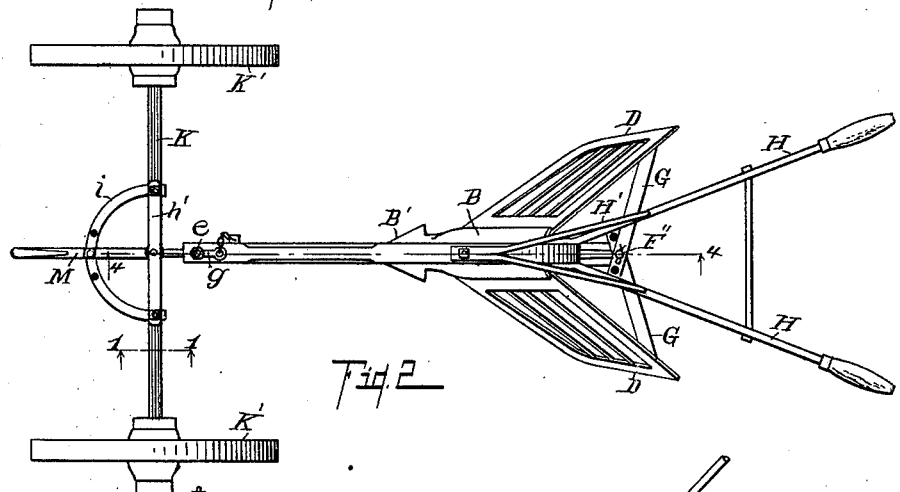
Figure 3:
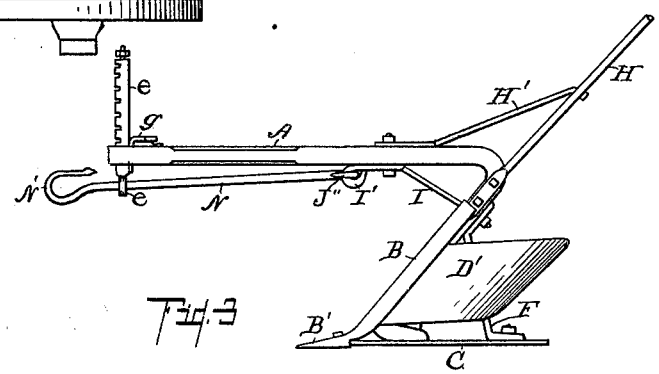

Figure 1 is a side elevation of my improved plow as coupled and arranged for use as a potato-digger, it being partially in section on line 1 1 of Fig. 2. Fig. 2 is a plan view of the structure appearing in Fig. 1. Fig. 3 is a detail view of the structure as adapted for use as a shovel-plow or plow for hilling potatoes. Fig. 4 is an enlarged detail longitudinal sectional elevation taken on a line corresponding to line 4 4 of Fig. 2. Fig. 5 is an enlarged detail sectional view taken on a line corresponding to line 5 5 of Fig. 4. Fig. 6 is an enlarged detail sectional view taken on a line corresponding to line 6 6 of Fig. 4, showing the method of coupling the wings to the plow. Fig. 7 is an enlarged detail view, partially in section, on line 7 7 of Fig. 4, showing the means of adjusting the wings. Fig. 8 is a detail plan view of the plate E to which the wings of the plow are hinged. Fig. 9 shows a detail of one of the wings of the plow made of a continuous plate or sheet. Fig. 10 is a detail plan view of the inner end of the draft-rod J.

In the drawings all of the sectional views are taken looking in the direction of the little arrows at the ends of the section-lines, and similar letters of reference refer to similar parts throughout the several views.

Referring to the lettered parts of the drawings, A is the beam of the plow, and A' the standard of the same, to which the remaining parts of the plow are attached. The beam and standard are made, preferably, integral. The lower end of the standard A' is turned back to afford attachment to the shoe. To the standard are secured the handles H, which are suitably braced by the braces H', extending to the beam.

Down the front of the standard extends a narrow plate B, like a plow-shim, terminating in an arrow-shaped point B' below, which extends forwardly at a very acute angle to the horizontal and is comparatively narrow. This is supported in position by the shoe C, which is bolted to the point and also secured by a suitable bolt or other means to the bottom end of the standard. This is still further braced at the rear by a brace F, extending from the rear of the shoe C up well toward the top of the standard A'. An arm F' extends to the rear of this brace F and carries a pivot F''. On the back side of the standard A' is secured a plate E, having ears, with perforations b, extending to each side of the standard. This is secured in position by the bolt d, which also serves to retain the plow-shim B in position.

When it is desired to make use of this plow as a potato-digger, I provide wings D, which are made up of a framework or skeleton with cross-rods, so that the soil will be broken to pieces by the same in spreading without liability of injuring the potatoes. Arms G G are connected by the pivots G' to lugs a and serve to connect these wings to the pivot F''', heretofore referred to. The arms G are provided with a series of holes, so that the angle of the wings can be varied. Hooks c are provided on the wings, which hook into the ears b b of the plate E, before referred to.

Where it is desired to use the plow for hilling purposes, continuous wings of sheet metal D' are attached in exactly the same way as the wings D, but throw the dirt up into the hills without breaking it apart.

A pair of wheels K' on an axle K is provided when the plow is intended for use as a potato-digger. This pair of wheels is coupled to the forward end of the rod J, which extends through an eye e' in a vertical adjustable bar e extending through the front portion of the bar. This bar e is notched at f on its front side, and a little lug or projection f' is adapted to engage the notches. A wedge g is provided to hold the bar e into engagement with the lug f'.

The front end of the bar J is swiveled at J' in the plate L. The plate L is provided with pivots n n' at its top and bottom and is supported by cross-piece h on bolts h' h', which extend through the axle K.

A bar M extends forward from the lower end of the pivot N' and is secured to a circle i, which is also carried by the axle K. On the front of the bar M is a hook for the attachment of whiffletrees. This means is provided so that in digging potatoes a span of horses can be used conveniently.

When the plow is used as a shovel-plow for hilling purposes, only a single horse is used, and in that event the front end of the draw-bar J is merely provided with a hook N instead of being swiveled, the height of the draw-bar J being adjusted by the same means and in substantially the same way as before, which is clearly illustrated in Fig. 4. The draw-bar J is connected by a suitable hook J'' to an eye I'. A bolt I extends through the standard and across to the beam to serve as a brace, and the forward end of it is formed into the eye I'.

Having thus described my improved plow, I desire to state that while I have shown it in its preferred form the details can be greatly varied without departing from my invention. While it is far better to form the beam and the standard in a single piece, I am aware that the other features of the plow might be employed with the beam and standard in separate parts. The plow would be quite effective with other draft means, and with the peculiar form of the shin and point stationary wings might be employed with very good results. The wings in this connection might be made adjustable by other means, though the exact means, I believe, possess great merit on account of their simplicity and are preferred by me.

Having thus described my invention, what I claim as new, and desire to secure by Letters Patent, is—

1. In a shovel-plow, the combination of the beam A and standard A' with suitable draft devices; a shim B fitted to the front of the standard and terminating in an arrow-shaped point B' at the bottom; a shoe C secured to the bottom of the standard, and extending out to serve as a support to the point; a brace F from the rear of the shoe to standard A'; an arm F' extending rearwardly from the brace F and having a pivot F''' thereon; a plate E with perforated ears b secured to the back side of the standard; suitable wings for the plow with hooks c for engaging the ears b, b; arms G with hooks G' adapted to engage ears a on the wings, the said arms having a series of holes to fit upon the pivot F''' to adjust the wings to different positions, all coacting for the purpose specified.

2. In a plow, the combination of the beam, bent downwardly and forwardly and then rearwardly at the bottom; a shim on said beam terminating in a point below; a shoe secured to the rearwardly-bent bottom portion; a brace from said shoe to the said beam; and wings secured to the beam back of the shim and supported by said brace, as specified.

3. In a plow, the combination of the beam, bent downwardly and forwardly and then rearwardly at the bottom; a shim on said beam terminating in a point below; a shoe secured to the rearwardly-bent bottom portion; a brace from said shoe to the said beam; and adjustable wings secured to the beam back of the shim and supported by said brace, as specified.

In witness whereof I have hereunto set my hand and seal in the presence of two witnesses.

ERNST PREUSS. [L. S.]

Witnesses:
SARAH M. GURNTZ,
M. B. ROSENBERRY.